Figure 1:
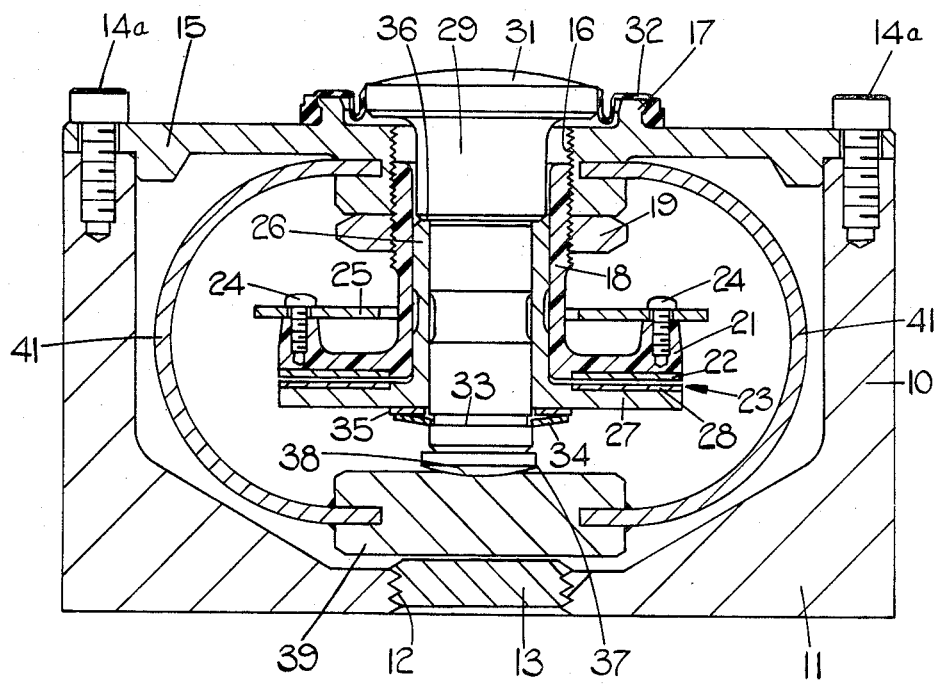

United States Patent [19]

Forrester et al.

[11] 4,320,667

[45] Mar. 23, 1982

[54] LOAD TRANSDUCER

[75] Inventors: John S. Forrester, West Midlands; David Rendall, Plymouth, both of England

[73] Assignee: Lucas Industries Limited, Birmingham, England

[21] Appl. No.: 82,057

[22] Filed: Oct. 5, 1979

[30] Foreign Application Priority Data

Oct. 17, 1978 [GB] United Kingdom .............. 40866/78

[51] Int. Cl.³ .............................................. G01L 1/14
[52] U.S. Cl. .................................. 73/862.64; 361/283
[58] Field of Search ............ 73/141 A, 818; 361/283, 361/290

[56] References Cited

U.S. PATENT DOCUMENTS

| | | | |
|---|---|---|---|
| 2,367,866 | 1/1945 | Humphreys et al. | 361/283 X |
| 3,090,226 | 5/1963 | Corti et al. | 73/141 A |
| 3,243,998 | 4/1966 | Vosteen | 73/141 A |
| 3,635,298 | 1/1972 | Kistler | 73/141 A X |
| 3,681,982 | 8/1972 | Hiratsuka et al. | 73/141 A |
| 3,757,573 | 9/1973 | Pechuk et al. | 73/141 A |
| 4,092,696 | 5/1978 | Boesen et al. | 361/283 |

*Primary Examiner*—Daniel M. Yasich

*Attorney, Agent, or Firm*—Holman & Stern

[57] ABSTRACT

A load transducer includes a hollow body and a movable control element mounted in the body and extending through the body to an external surface of the body so that an external mechanical load can be applied to the control element to move the control element in one direction. Resilient means separate from the control element urges the control element in the opposite direction such that, in use, the control element is displaced by an amount dependent on the magnitude of the applied load. Coupled to the control element is a variable capacitor including a first electrode supported by a first carrier member in which the first carrier member is mounted so that the carrier members are capable of relative sliding movement in a direction perpendicular to a pair of parallel mutually presented surfaces of the electrodes. The carrier members are arranged so that movement of the control element serves to impart said relative sliding movement to the carrier members, whereby the distance between said electrode surfaces varies in accordance with the magnitude of the applied load but said surfaces remain in parallel, spaced relationship so that the capacitance of said capacitor varies with the applied load.

11 Claims, 3 Drawing Figures

LOAD TRANSDUCER

This invention relates to a load transducer particularly, but not exclusively, for measuring axle loadings in wheeled vehicles.

Known load measuring devices include electrical resistance strain gauges and inductive load transducers operating on the differential transformer principle. However, both of these known devices suffer from a substantial cost disadvantage.

Variable capacitance load transducers are also known (see, for example, British Pat. Nos. 1085404 and 1453934) but, in order to ensure that the transducers provide a substantially linear output, the known devices are complex mechanically and/or include complex electronic circuitry, thereby increasing the cost of the devices.

An object of the present invention is to provide a variable capacitance load transducer which produces a substantially linear output but which is of reduced complexity and cost as compared with the known devices.

Accordingly, the invention resides in a load transducer including a hollow body, a movable control element mounted in the body and extending through the body to an external surface of the body so that an external mechanical load can be applied to the control element to move the control element in one direction, resilient means separate from the control element and urging the control element in the opposite direction such that, in use, the control element is displaced by an amount dependent on the magnitude of the applied load, and a variable capacitor including a first electrode supported by a first carrier member and a second electrode supported by a hollow second carrier member in which the first carrier member is mounted so that the carrier members are capable of relative sliding movement in a direction perpendicular to a pair of parallel mutually presented surfaces of the electrodes, the arrangement being such that movement of the control element serves to impart said relative sliding movement to the carrier members, whereby the distance between said surfaces varies in accordance with the magnitude of the applied load while said surfaces remain in parallel relationship so that the capacitance of said capacitor varies.

The arrangement described in the preceding paragraph not only provides a mechanically simple variable capacitance load transducer, but also the capacitance of the capacitor can be arranged to vary substantially directly or inversely with the magnitude of the applied load so that the electronic circuitry required to produce a linear voltage or current output can be simplified.

Preferably, the distance between said surfaces varies substantially linearly with the applied load and said capacitance varies substantially inversely with the applied load.

Preferably, the distance between said surfaces varies substantially linearly with the applied load and said capacitance varies substantially inversely with the applied load.

Conveniently, said first carrier member is also hollow and said control element extends through, and is fixed relative to, the first member.

Conveniently, the capacitor electrodes are defined by a paid of planar, parallel plates, Preferably, said capacitor forms part of an electrical oscillator operable to produce a frequency output dependent on the capacitance of the capacitor and hence on the applied load.

Preferably, the frequency output of the oscillator is inversely proportional to said capacitance.

More preferably, the oscillator is an astable R-C square wave oscillator, most preferably of the type employing CMOS inverters.

Preferably, said oscillator forms part of an electrical circuit including means for converting said frequency output to a voltage level dependent on the applied load.

Preferably, said electrical circuit is housed within said body.

Figure 2:
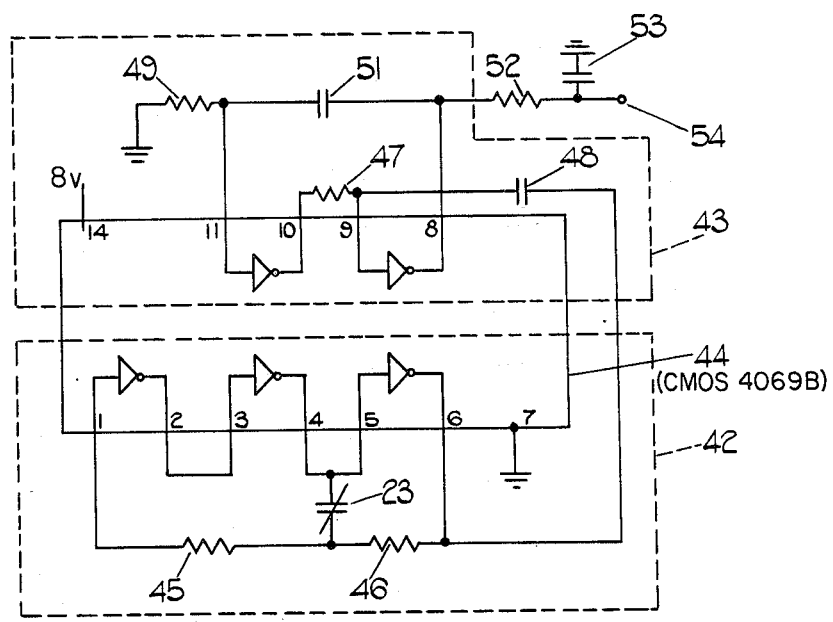
Figure 3:
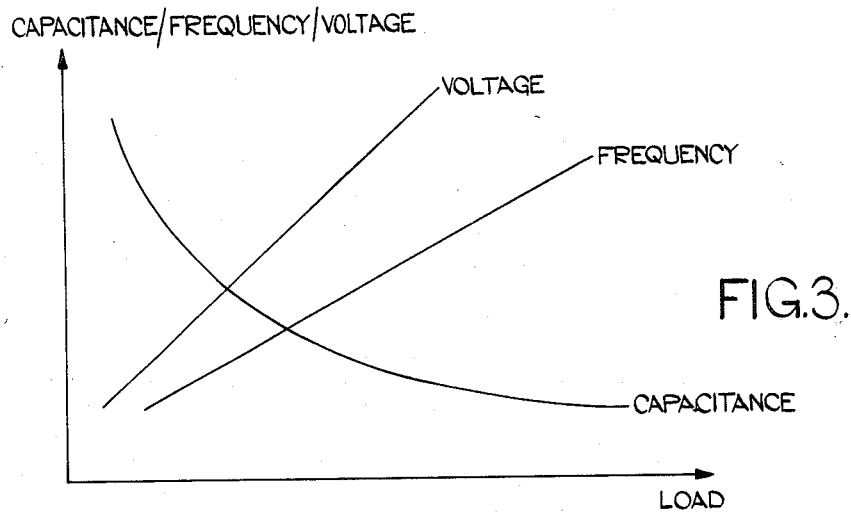

In the accompanying drawings:

FIG. 1 is a sectional view of a load transducer according to one example of the invention, FIG. 2 is a circuit diagram of the transducer shown in FIG. 1, and FIG. 3 illustrates graphically the operation of the transducer shown in FIG. 1.

Referring to FIG. 1, the transducer includes a hollow, rectangular section body 10 formed of dural and closed at one end by an integral base member 11. Formed in the base member 11 is a centrally disposed, screw-threaded aperture 12 which receives a complementarily threaded mild steel screw 13 which is movable into the body to define an adjustable stop. Secured to the other end of the body 10 by screws 14a is a mild steel cover plate 15 formed with a centrally disposed, screw-threaded bore 16 aligned with the aperture 12 in the base member 11. Surrounding the aperture 16 is an annular wall 17 integral with and upstanding from the outer surface of the cover plate 15.

Engaged in the bore 16 so as to depend from the cover plate 15 and extend coaxial with the body 10 is a cylindrical, externally screw-threaded sleeve 18. The sleeve 18 is formed from the acetal copolymer sold under the trademark "KEMATAL" and is located relative to the cover plate 15 by a locknut 19. At its free end, the sleeve 18 is formed integrally with an annular, radially extending flange 21 which at its surface presented to the base member 11 supports an annular, brass plate 22 defining a first electrode of a variable paralel plate capacitor 23. Secured to the opposite surface of the flange 21 by means of screws 24 is an annular printed circuit board 25 which supports components of the electrical circuit shown in FIG. 2 and described below.

Slidably mounted within the sleeve 18 coaxial with the sleeve 18 and the body 10 is a further hollow cylindrical sleeve 26 again formed of KEMATAL. At one end, the sleeve 26 projects from the sleeve 18 and is formed with an integral, radially extending, annular flange 27 which at one major surface supports an annular, brass plate 28 in parallel, spaced relationship with the plate 22. The plate 28 defines a second electrode of the capacitor 23 and it will be appreciated that the capacitance of the capacitor can be varied by moving the plate 28 relative to the plate 22. Sleeve 26 may be considered as a carrier member which bears electrode plate 28. Sleeve 18 is likewise a carrier member for electrode plate 22.

Extending through and coaxial with the sleeves 26, 18 is a stepped, cylindrical, case-hardened mild steel plunger 29 which at one end projects from the cover plate 15 and includes an enlarged head portion 31. A deformable, rubber sleeve 32 extends between the head portion 31 and the upstanding wall 17 so as to seal the body 10 against ingress of foreign material. Adjacent its other end, the plunger 29 is formed with a peripheral groove 33 which receives a bowed, steel circlip 34 for locating the plunger 29 in position relative to the sleeve 26. The circlip 34 traps a thrust washer 35 against the flange 27 of the sleeve 26 and also urges the other end of the sleeve 26 against a shoulder 36 defined by the plunger 29. The circlip 34 is arranged to accommodate for differential thermal expansion between the sleeve 26 and the plunger 29.

The end surface of the plunger 29 remote from the head portion 31 is substantially planar and engages a planar surface of a case-hardened mild steel button 37. The opposite surface of the button 37 is part-spherical and seats in a complementary recess 38 formed in a mild steel carrier 39 which is supported above the screw 13 by a pair of C-section constant rate springs 41 extending between the carrier 39 and the lower surface of the cover plate 15. The screw 13 limits movement of the carrier 39 thereby preventing the springs 41 being over-strained.

More specifically, the transducer is arranged to cope with various applied loads within a specified range. Within this range, carrier 39 is free to move without constraint. However, should the transducer be mis-used and a load applied which exceeds that specified, then the C-springs could become over-strained and the instrument thereby damaged. To prevent such an occurrence, a stop in the form of screw 13 is provided, whereby the C-springs are prevented from extending beyond an amount set by the screw stop.

The shoulder 36 is arranged to be located substantially in alignment with the innermost end of the bore 16 so that, in use, if there is any differential thermal expansion between the synthetic resin material of the sleeves 18, 26 and the metal components comprising the springs 41, the cover plate 15 and plunger 29, this will result in the plates 22, 28 being moved by equal amounts and hence will not affect the capacitance of the capacitor 23.

In use, a load to be measured is applied to the head portion 31 so as to urge the plunger 29 and the sleeve 26 to move into the body 10 relative to the sleeve 18 and against the action of the springs 41. Since C-springs 41 are constant rate springs, displacement of plunger 22 relative to body 10 is proportional to the applied load. The plate 28 is thereby moved away from the plate 22 by an amount directly proportional to the magnitude of the applied load so as to vary the capacitance of the capacitor 23. Any misalignment between the sleeves 18, 16 and the plunger 29 can be accommodated by movement of the button 37 relative to the plunger 29 and the carrier 39 and hence, as shown in FIG. 3, the capacitance of the capacitor 23 varies inversely with the load applied to the plunger 29. This derives from the well known fact that the capacitance of a parallel plate capacitor varies inversely with the distance between the plates.

In the above example, the capacitor plates 22, 28 are moved away from each other as the applied load increases and this arrangement is preferred since it avoids any problem of the capacitor plates and/or their supporting flanges 21, 27 being damaged as a result of mechanical overloads. It is also preferred to arrange that at least one of the capacitor plates 22, 28 is recessed within its respective flange 21, 27 so as to prevent an electrical short between the plates if the flanges 21, 27 should contact each other.

Referring to FIG. 2, the capacitor 23 and the components provided on the circuit board 25 define an astable R-C square wave oscillator, indicated generally at 42 and operating between 20 and 40 KHz and a monostable circuit indicated generally at 43. Both the oscillator 42 and monostable circuit 43 are assembled from a single CMOS 4069B hex inverter package 44 supplied by RS Components Ltd. In the astable oscillator 42, pins 1 and 6 of the package 44 are interconnected by way of a 3.3 M ohm resistor 45 and a 120K ohm resistor 46 in series. The junction of the resistors 45, 46 is connected to one electrode of the capacitor 23, the other electrode of which is connected to pins 4 and 5 of the package 44. Pins 2 and 3 of the package 44 are ganged, pin 7 is earthed, pin 14 is connected to an 8 volt d.c. supply, and pin 6 defines the output terminal of the oscillator 42. An astable oscillator of this general form is described in National Semi-Conductor CMOS Integrated Circuits 1975, Application Note AN 118 entitled "CMOS Oscillators", p226, from which it will be seen that the frequency of the oscillator 42 is inversely proportional to the capacitance of the capacitor 23. Thus, as shown in FIG. 3, since the capacitance of the capacitor 23 is inversely proportional to the distance between the plates 22, 28 the oscillator 42 provides a frequency output which is directly proportional to the distance between the electrodes of the capacitor 23 and hence upon the applied load.

The output from the astable oscillator 42 is fed through a 47 pF capacitor 48, forming part of the monostable circuit 43, to pin 9 of the package 44 and pins 9 and 10 of the package are bridged by a 120K ohm resistor 47. Pin 11 of the package 44 is earthed through a 120K ohm resistor 49 and is connected to pin 8 of the package through a 47 pf capacitor 51. Pin 8 of the package 44 provides an output which is a constant mark, variable space square waveform of a frequency determined by the astable oscillator 42. A 100K ohm resistor 52 is connected between pin 8 of the package 44 and an output terminal 54, while a 0.1 pf capacitor 53 is connected between the output terminal and earth. The circuit defined by the capacitor 53 and the resistor 52 forms a simple filter circuit such that the output taken at the terminal 54 is a D.C. voltage whose value is directly proportional to the load being measured. It is to be noted that a monostable circuit similar to the circuit 43 is described on page 625 (FIG. 12) of the RCA COS/MOS Integrated Circuits Handbook, 1977.

What has been described in the foregoing is a transducer which operates by variation in capacitance of a capacitor which forms part of an electrical oscillator whose frequency output is inversely proportional to the capacitance of the capacitor. Since the capacitance is inversely proportional to the displacement of a plunger, the double inversion permits the frequency of the oscillator to be directly proportional to the plunger displacement. This, then, is the essential feature of applicant's invention.

It is to be appreciated that, although other types of astable R-C square wave oscillators could be used in the transducer described above (e.g. Schmitt-trigger devices), the use of oscillators employing CMOS inverters is preferred since these require only a single timing capacitor, have a high input impedance and are readily available in dual, quad and hex integrated packages.

We claim:
1. A transducer including a hollow body, a movable control element, means mounting the control element in the body for sliding movement relative to the body, the control element extending through the body to an external surface of the body so that a movement of an external body can be imparted to the control element in one direction relative to the body, a first carrier member movable with the control element in said one direction relative to the body, a second carrier member fixed relative to the body at least during movement of the first carrier member, a variable capacitor including first and second electrodes, the first electrode being supported by the first carrier member and including a first surface extending perpendicular to said one direction, and the second electrode being supported by the second carrier member and including a second surface which extends in parallel spaced relationship with the first surface such that movement of the first carrier member relative to the second carrier causes the distance between said surfaces to vary, while said surfaces remain in parallel relationship, whereby the capacitance of the capacitor varies substantially inversely with the distance between said surfaces, and electrical oscillator circuit means, including said capacitor, for providing an output signal having a frequency which is inversely proportional to said capacitance and hence directly proportional to the distance between the electrodes.

2. A transducer as claimed in claim 1, wherein the capacitor electrodes are defined by a pair of planar, parallel plates.

3. A transducer as claimed in claim 1, wherein the oscillator means is an astable R-C square wave oscillator.

4. A transducer as claimed in claim 1, wherein the oscillator means is an astable R-C square wave oscillator of the kind employing CMOS inverters.

5. A transducer as claimed in claim 1, wherein said oscillator means forms part of an electrical circuit including means for converting said frequency output to a voltage level dependent on the distance between the electrode.

6. A transducer as claimed in claim 5, wherein said electrical circuit is housed within the body.

7. A transducer as claimed in claim 1, and including resilient means separate from the control element and urging the control element in the opposite direction to said one direction so that, in use, when the control element is displaced by said external movement, the amount of the displacement of the control element is dependent on the magnitude of the load effecting said external movement, the frequency of said output signal thereby being directly dependent on the applied load.

8. A transducer as claimed in claim 7, wherein said resilient means includes constant-rated spring means.

9. A load transducer including a hollow body, a movable control element, means mounting the control element in the body for sliding movement relative to the body, the control element extending through the body to an external surface of the body so that an external mechanical load can be applied to the control element in one direction to displace the control element in said one direction relative to the body, constant-rated spring means including a pair of C-section springs separate from the control element and urging the control element in the opposite direction such that, in use, the control element is displaced by an amount depending on the magnitude of the applied load, a first carrier member movable with the control element in said one direction relative to the body, a second carrier member fixed relative to the body at least during movement of the first carrier member, a variable capacitor including first and second electrodes, and first electrode being supported by the first carrier member and including a first surface extending perpendicular to said one direction, and the second electrode being supported by the second carrier member and including a second surface which extends in parallel spaced relationship with the first surface such that movement of th first carrier member relative to the second carrier member causes the distance between said surface to vary, while said surfaces remain in parallel relationship, whereby the capacitance of the capacitor varies substantially inversely with the distance between said surfaces, and electrical oscillator circuit means including said capacitor, for providing an output signal having a frequency which is inversely proportional to said capacitance and hence directly proportional to the distance between the electrodes, said oscillator means forming part of an electrical circuit including means for converting the frequency of said output signal to a voltage level dependent on the applied load.

10. A transducer as claimed in claim 1 or claim 9, wherein the second carrier member is hollow and the first carrier member is mounted in the second carrier member so as to be capable of sliding movement relative thereto in said one direction.

11. A transducer as claimed in claim 1 or claim 9, wherein the first carrier member is hollow and said control element extends through, and is fixed relative to, the first carrier member.

* * * * *